United States Patent [19]
Gower

[11] 3,885,384
[45] May 27, 1975

[54] HOOK CONNECTOR ASSEMBLY
[76] Inventor: Roger L. Gower, Suite 302, 1911 Jefferson Davis Hwy., Arlington, Va. 22202
[22] Filed: Jan. 4, 1974
[21] Appl. No.: 430,752

[52] U.S. Cl. .............................. 59/93; 24/230.5 CR
[51] Int. Cl. ............................................ F16g 15/00
[58] Field of Search ............... 59/93; 24/230.5 CR, 24/230.5 SA, 230.5 R, 415 L, 415 CH, 24/238, 239

[56] References Cited
UNITED STATES PATENTS
| | | | |
|---|---|---|---|
| 963,931 | 7/1910 | Olson | 24/239 |
| 987,865 | 3/1911 | Denison | 24/230.5 SA |
| 2,987,792 | 6/1961 | O'Brien | 24/238 X |

Primary Examiner—Milton S. Mehr
Attorney, Agent, or Firm—Pollock, Philpitt & Vande Sande

[57] ABSTRACT

This invention relates to a connector hook and a safety ring slidably and rotatably disposed thereupon, for connecting chains assembled in substantially perpendicular relationship, the connector hook having a convex curvature of the shank between the throat and the base plate sufficient to permit movement of a chain link past the safety ring at the point of an arcuate concave deformation on the periphery of the ring, thus permitting the chain link to become seated in the throat of the connector hook.

2 Claims, 3 Drawing Figures

PATENTED MAY 27 1975            3,885,384

HOOK CONNECTOR ASSEMBLY

The product of this invention is a structure having in combination a hook, a shank convexly curved opposite the tip of the hook, and a base plate transversely and integrally connected to the end of the shank; and a safety ring member slidably and rotatably disposed upon the hook, optionally permitting entry of a chain link into the throat of the hook, or preventing disengagement of said link therefrom.

It is common practice in the chain industry to use a hook to connect, for example, the side chain to the cross member of a set of tire chains. In such use, a connector hook is inserted through a link of the side chain and is pulled through such link until the base plate is in direct contact with the side bars of the link of chain through which it is inserted. The tip of the hook is then inserted into the end link of a cross chain, or of a tag chain connecting a heavy traction member on truck and skidder chains. This is satisfactory so long as the chains are maintained taut. However, during assembly, or in the event of slack developing in the tire chain assembly, the cross chain or tag chain may become disengaged from the hook and the assembly may thus be made partially ineffective. It is for the purpose of preventing such accidental disengagement that the product of this invention has been developed.

After inserting the connector hook through the side chain, there is applied a ring which slips over the tip and the throat of the hook, and is accommodated on the convexly curved portion of the shank. The ring has an arcuate cut-out on one side, and when said ring is rotated so that the cut-out is disposed directly opposite the tip of the hook, the end link of the cross chain or tag chain may then be applied over the end of the hook, past the ring which is held for this purpose in the convexly curved portion of the shank, and into the throat of the connector hook.

For a better understanding of the invention, reference is made to the accompanying drawings, in which.

Figure 1:
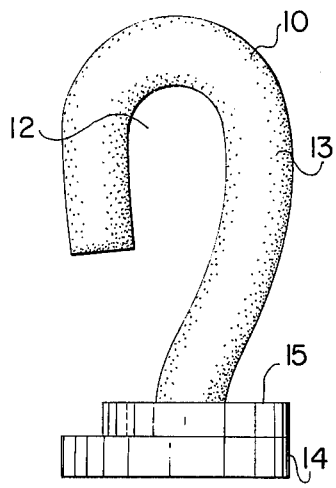
FIG. 1 is a side elevation of the hook of this invention.
Figure 2:
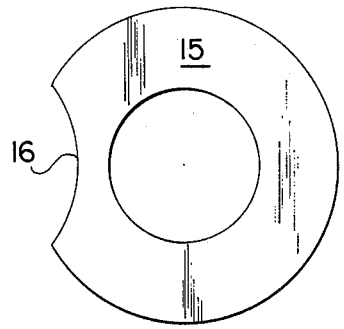
FIG. 2 is a top plan of a safety ring having an arcuate cut-out upon one portion of the periphery thereof.

Referring more particularly to the drawings,

In FIG. 1, hook 10 is formed with tip 11, throat 12, and convexly curved shank 13, the end of said shank being integrally and transversely attached to base plate 14. Slidably and rotatably disposed upon said shank is safety ring 15, having arcuate cut-out 16 on one side thereof. The top plan of ring 15 in FIG. 2 shows cut-out 16 and the arcuate curvature thereof, which arc defines a curve substantially equal to the curvature of the end of a nominal size chain link for use with said hook.

Figure 3:
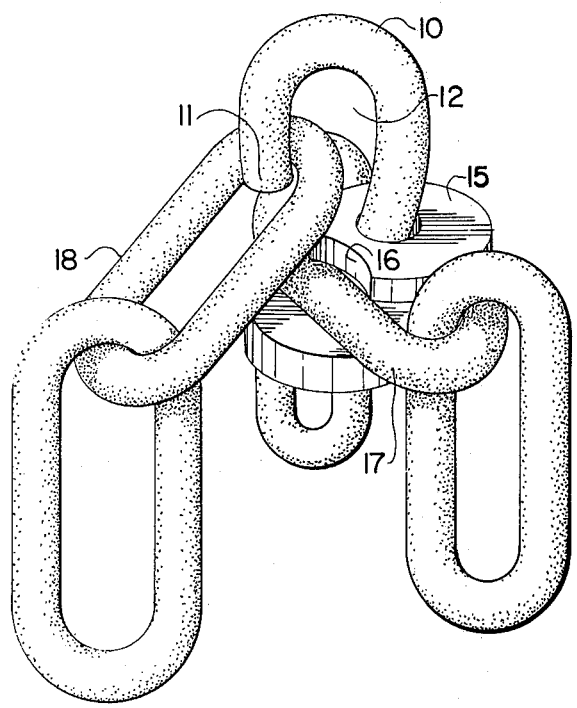
FIG. 3 is a perspective view of this invention employed in the assembly of a cross chain and a side chain.

In FIG. 3, hook 10 is shown after it has been inserted through a link 17 of a side chain, the safety ring 15 being subsequently applied upon the shank. When end link 18 of a cross chain or tag chain is to be secured on said hook, this is accomplished by lifting ring 15 to a position on the shank at the maximum diameter of the throat 12, and with the arcuate cut-out 16 facing the tip 11 of the hook, the end link 18 passes into the throat.

Since the ring fits loosely upon the shank, it rotates readily and there is minimal probability that it will ever permit disengagement of the end link of the cross chain from the hook. However, when disassembly is required, this may be accomplished rapidly and easily, without the use of tools and without the need for any unique skill, but merely by holding the ring at the point on the shank of maximum distance from the tip of the hook, and turning the ring to dispose the arcuate cut-out directly opposite the tip.

Having thus disclosed my invention, I claim:

1. Apparatus for detachable connection of a link to a hook or the like comprising:

a hook having a tip, a throat, a curved shank, and a base plate integrally connected with the shank, a safety ring being slidable along and rotatable about said shank, the curvature of said shank being such as to move said safety ring in translation away from said tip as said ring is moved along said shank away from the location of said base plate, said safety ring defining therein a recess at its edge, said safety ring in its position adjacent said base plate restricting entry of the link into the throat of the hook and permitting entry thereof only as said safety ring is moved along said shank away from base plate and concurrently is rotated about said shank to move said recess into position directly opposite said tip of said hook.

2. The apparatus of claim 1 wherein said recess in said safety ring is of arcuate shape having a curvature corresponding generally to the curvature of the end portion of the link.

* * * * *